(12) United States Patent
Andrew

(10) Patent No.: US 7,496,844 B2
(45) Date of Patent: *Feb. 24, 2009

(54) AUTOMATICALLY LAYING OUT DIALOGS AND CONTROL PANELS DEPENDING ON SCREEN SIZE

(75) Inventor: Felix GTI Andrew, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 610 days.

This patent is subject to a terminal disclaimer.

(21) Appl. No.: 10/768,268

(22) Filed: Jan. 29, 2004

(65) Prior Publication Data

US 2005/0172222 A1   Aug. 4, 2005

(51) Int. Cl.
*G06F 3/00* (2006.01)
(52) U.S. Cl. ..................................... 715/517
(58) Field of Classification Search ................ 715/517, 715/518, 519, 520, 521, 527, 542, 762
See application file for complete search history.

(56) References Cited

U.S. PATENT DOCUMENTS

| | | | | |
|---|---|---|---|---|
| 5,699,535 | A * | 12/1997 | Amro | 715/800 |
| 6,335,743 | B1 * | 1/2002 | Owings | 715/801 |
| 6,392,673 | B1 * | 5/2002 | Andrew et al. | 715/800 |
| 6,456,305 | B1 * | 9/2002 | Qureshi et al. | 715/800 |
| 6,750,887 | B1 * | 6/2004 | Kellerman et al. | 715/788 |
| 6,983,422 | B1 * | 1/2006 | Gunther | 715/768 |

OTHER PUBLICATIONS

H. Rex Hartson et al.; "Human-Computer Interface Development: Concepts and Systems for Its Management"; ACM Computing Surveys, vol. 21, No. 1, Mar. 1989; pp. 5-92.
Robert W. Scheifler et al.; "The X Window System"; ACM Transactions on Graphics, vol. 5, No. 2, Apr. 1986; pp. 79-109.

* cited by examiner

*Primary Examiner*—Stephen Hong
*Assistant Examiner*—Samir Termanini
(74) *Attorney, Agent, or Firm*—Merchant & Gould PC

(57) ABSTRACT

The present invention allows windows, defined without any explicit resizing parameters, to be resized appropriately to the types of controls contained within them. The approach is to "walk-through" the dimensional definitions for the controls, their sizes and positions, and the dimensions of the window itself. With this information, rows and columns are defined and identified as resizable. When the window dimensions are changed, the changes in height and width are distributed among the resizable rows and columns.

18 Claims, 8 Drawing Sheets

AUTOMATICALLY LAYING OUT DIALOGS AND CONTROL PANELS DEPENDING ON SCREEN SIZE

BACKGROUND OF THE INVENTION

Many computer operating systems generate window-based graphical user interfaces (GUIs). The operating systems generally provide tools to allow developers to generate windows with controls called dialogues. Operating systems may provide other kinds of user interface elements such as forms as well. With different sized monitors and different resolutions for displays, users generally want to display as much information as possible. Since windows are typically defined for the smallest standard screen size and resolution, users with larger screens typically have displays that still have space available. Smaller displays, such as displays on mobile devices are limited in the amount of information they may display. For these devices, it would be useful to display as much information as possible while retaining usability.

A window can be defined by developers such that it can be resized and its contents redistributed to take advantage of the new size. A developer typically uses a resource editor to define the layout and characteristics of the window. A resulting resource file contains detailed specifications that define the controls and which parts of the box can be resized and along which axes. The use of resource files allows for changes to be made to the arrangement and content of windows and their controls without the need to modify the application code that displays the controls. The controls corresponding to the labels of the window can be changed by simply modifying the resource file for the particular window. The application can then be re-built without recompiling and, when subsequently executed, the operating system opens the resource file and generates the window. The process of generating the window may involve reading the resource file and generating a derivative memory image that is used to create the window rather than stepping through the resource file in real time as the window is actually generated.

The need to specifically define the resizing characteristics of the window arises because only some controls can be expanded or decreased in a useful way. For example, expanding the window to increase the size of each feature, including fonts, would not allow more information to be displayed. Operating systems generally provide mechanisms for defining resizable windows, but the code is complex and most developers would prefer the expedient of avoiding the complexity of such expense. Developers may also already have a large number of windows that are already defined. To modify these to make them resizable requires a substantial amount of additional work. Also, any time the windows are revised to add new controls, the whole set of resizing code must revised to be compatible with the new controls.

Many applications already allow users to change the font size of the view of a document. The standard font sizes of the operating system user interface can also be changed. But this may not enhance the windows or controls as desired.

SUMMARY OF THE INVENTION

The present invention is directed towards allowing windows, such as full screen windows on a PDA, defined without any explicit resizing parameters, to be resized appropriately to the types of controls contained within them. The approach is to "walk-through" the dimensional definitions for the controls, their sizes and positions, and the dimensions of the window itself. With this information, rows and columns are defined and identified as resizable. When the window dimensions are changed, the changes in height and width are distributed among the resizable rows and columns.

According to another aspect, only rows, only columns, both rows and columns, and neither rows nor columns are identified as resizable. The resizing command may be issued automatically or may be performed manually.

According to yet another aspect, a set of specifications about the resizing behavior of the various types of controls is created. For example, buttons and statics do not resize when they are constrained by other controls. List boxes can grow or decrease in length and height. Edit boxes can get wider, but not taller. The controls have a minimum height that allows the control to be useful.

According to yet another aspect, the walk-through occurs when the window is ready to be displayed. When the application calls an operating system function to display the window, the application calls a particular API, in response to which particular messages are sent (most of the messages may be internal, for example, the particular font to be used). The operating system determines what controls are defined for the window. The operating system thus essays the resource file for the window, or a memory image derived from it, to define columns and rows partitioning the various controls. One set of columns and rows corresponds to borders. Using a set of characteristics for each type of control, the operating system determines which columns and which rows are resizable. From this information, it is determined along which axes the window can change size.

Upon a message indicating new dimensions, the new size is allocated evenly among the resizable columns/rows when the window may be resized. The controls are then reattached to the columns and rows. If the controls are resizable, they are stretched or shrunk to fill the respective column or row that changed size. The window is then repainted with the new sizing information.

According to still yet another aspect of the invention, the sizing information may be given as a global operating system parameter. For example, all windows may be resized by a fixed percentage, wherever possible. The global operating system parameter can be coupled to the screen resolution so that when the user changes the screen from landscape mode to portrait mode, all windows are automatically resized, to the extent possible, by a computed factor.

According to yet another aspect, no additional coding for the windows is necessary to allow such resizing. Also, a minimum of additional data is used to help insure that processing is speedy. In addition, the particular set of resizing rules insures that the resized windows are visually agreeable and that the additional size available exploited to maximum ergonomic advantage.

DETAILED DESCRIPTION OF THE PREFERRED EMBODIMENT

The present invention is directed towards allowing windows, defined without any explicit resizing parameters, to be resized appropriately to the types of controls contained within them. The approach is to "walk-through" the dimensional definitions for the controls, their sizes and positions, and the dimensions of the window itself. With this information, rows and columns are defined and identified as resizable. When the window dimensions are changed, the changes in height and width are distributed among the resizable rows and columns.

Illustrative Operating Environment

Figure 1:
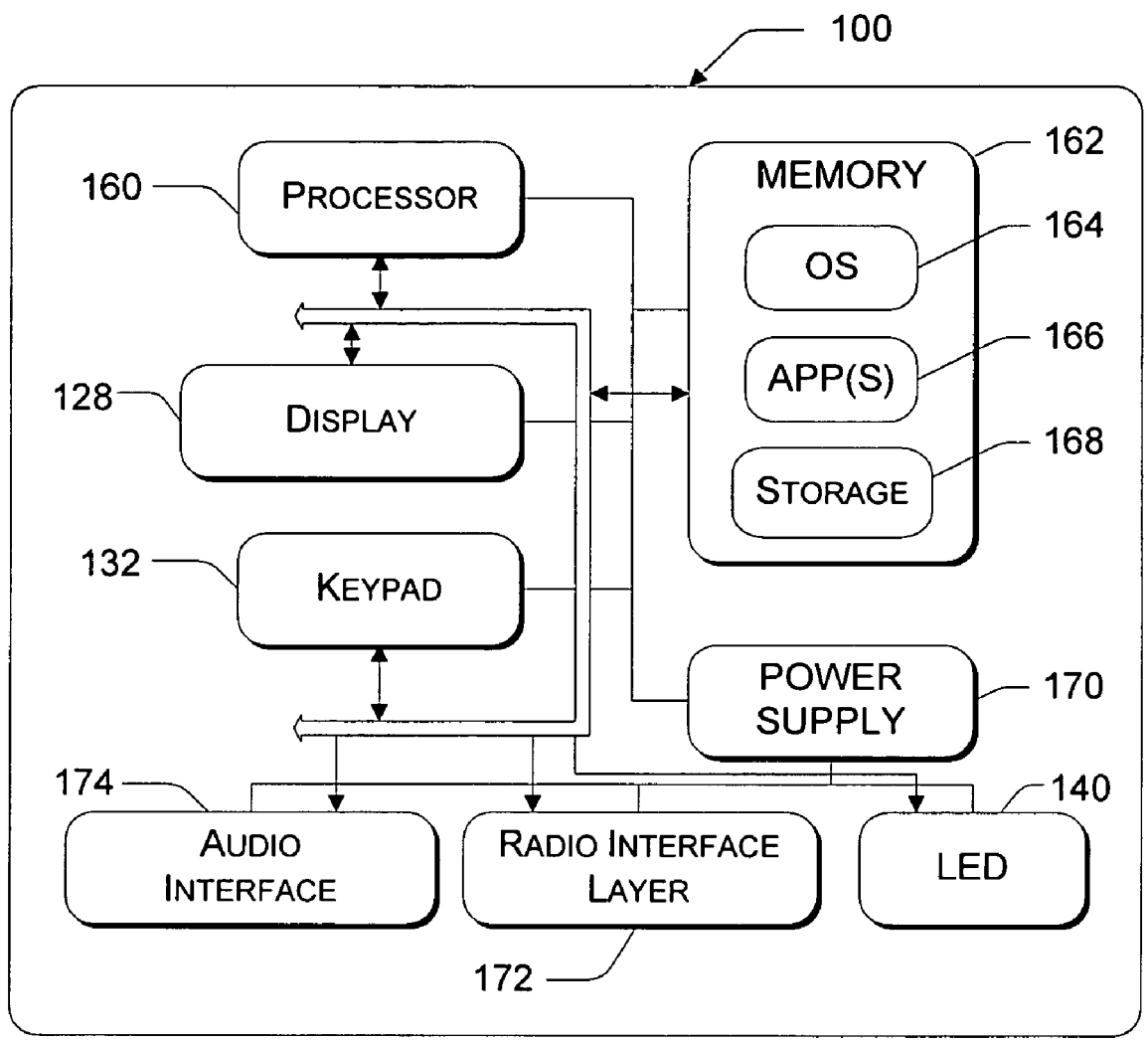
FIG. 1 illustrates an exemplary computing device that may be used according to exemplary embodiments of the present invention.

With reference to FIG. 1, one exemplary system for implementing the invention includes a computing device, such as computing device 100. FIG. 1 illustrates a mobile computing device that may be used according to an exemplary embodiment of the present invention. Mobile computing device 100 includes processor 160, memory 162, display 128, and keypad 132. Memory 162 generally includes both volatile memory (e.g., RAM) and non-volatile memory (e.g., ROM, Flash Memory, or the like). Mobile computing device 100 includes operating system 164, such as the Windows CE operating system from Microsoft Corporation, or another operating system, which is resident in memory 162 and executes on processor 160. Keypad 132 may be a push button numeric dialing pad (such as on a typical telephone), a multi-key keyboard (such as a conventional keyboard). Display 128 may be a liquid crystal display, or any other type of display commonly used in mobile computing devices. Display 128 may be touch-sensitive, and would then could also act as an input device. According to one embodiment of the invention, display 128 has a 240×320 resolution. Display 128, however, may have any resolution.

One or more application programs 166 are loaded into memory 162 and run on the operating system 164. A resizing application resides on mobile computing device 100 and is programmed to provide operations relating to a resizing operation. The resizing application may reside in the hardware or software of the device. Mobile computing device 100 also includes non-volatile storage 168 within memory 162. Non-volatile storage 168 may be used to store persistent information which should not be lost if mobile computing device 100 is powered down.

Mobile computing device 100 includes power supply 170, which may be implemented as one or more batteries. Power supply 170 might further include an external power source, such as an AC adapter or a powered docking cradle that supplements or recharges the batteries.

Mobile computing device 100 is shown with two types of optional external notification mechanisms: LED 140 and audio interface 174. These devices may be directly coupled to power supply 170 so that when activated, they remain on for a duration dictated by the notification mechanism even though processor 160 and other components might shut down to conserve battery power. Audio interface 174 is used to provide audible signals to and receive audible signals from the user. For example, audio interface 174 may be coupled to a speaker for providing audible output and to a microphone for receiving audible input, such as to facilitate a telephone conversation.

Mobile computing device 100 also includes wireless interface layer 172 that performs the function of transmitting and receiving wireless communications. The wireless interface layer 172 facilitates wireless connectivity between the mobile computing device 100 and the outside world. According to one embodiment, transmissions to and from the wireless interface layer 172 are conducted under control of the operating system 164. In other words, communications received by wireless interface layer 172 may be disseminated to application programs 166 via operating system 164, and vice versa.

Communications connections are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
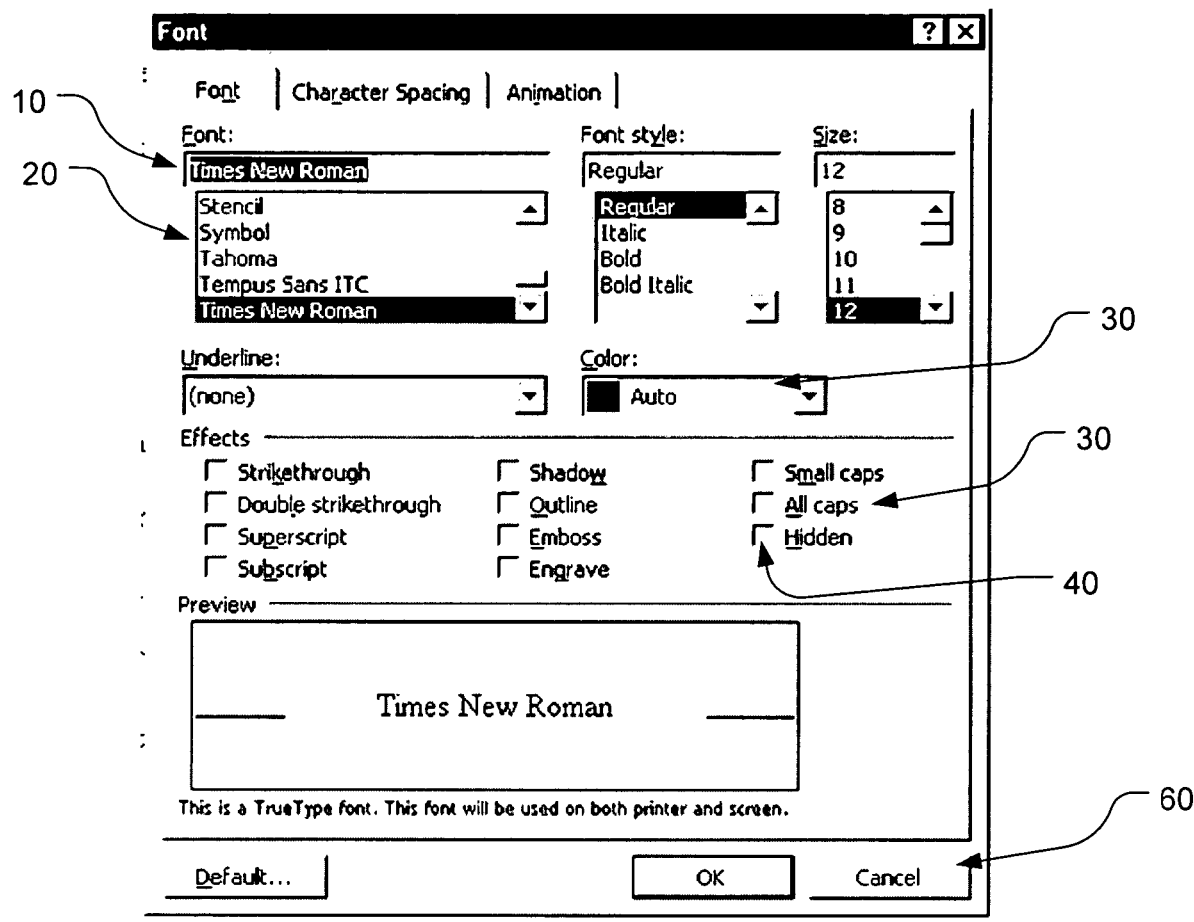
FIG. 2 shows an exemplary window.

FIG. 2 shows an exemplary window, in accordance with aspects of the invention.

Figure 3:
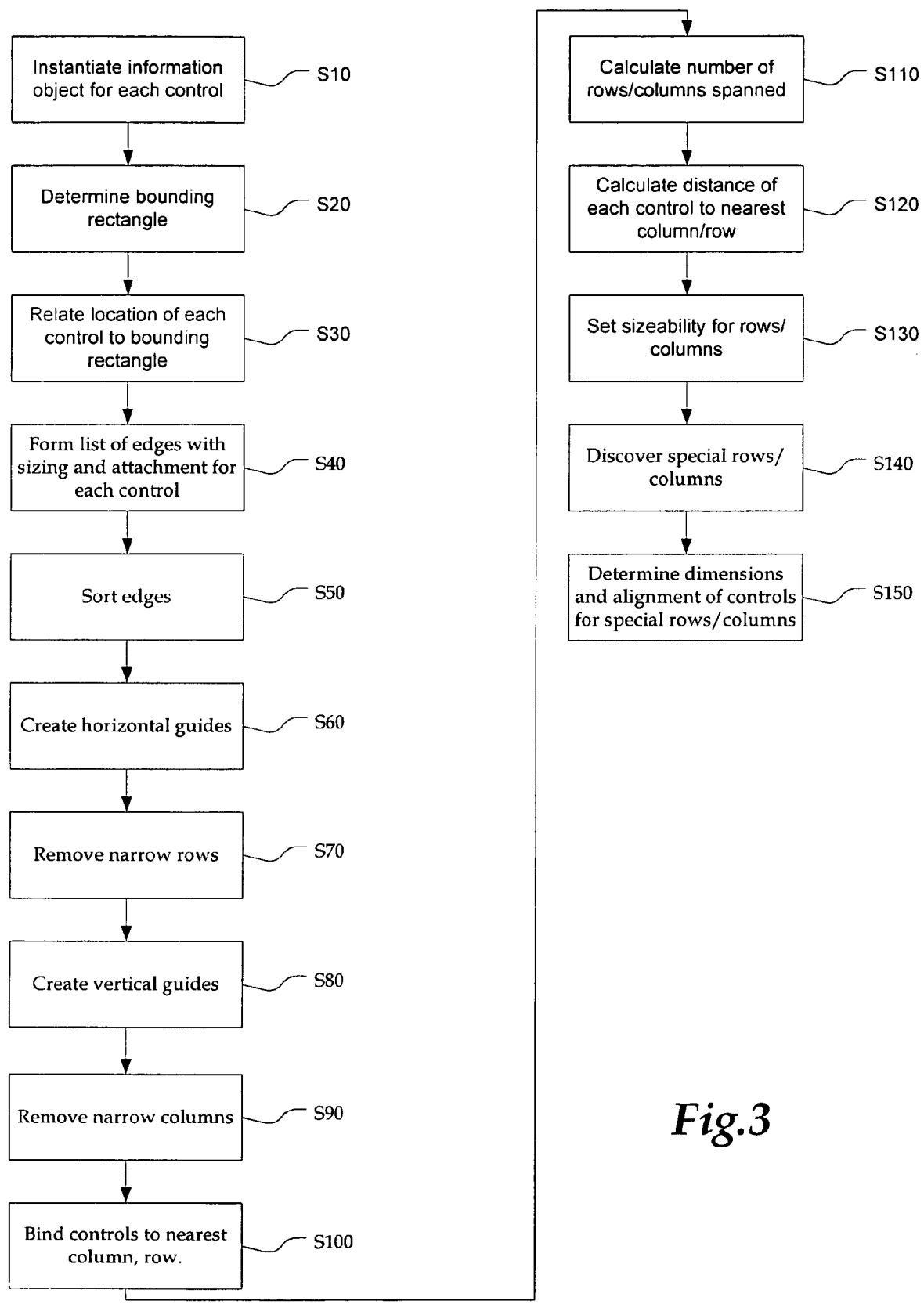
FIG. 3 is a flow chart defining a procedure for determining attributes of a window for purposes of resizing the window.

Referring to FIGS. 2 and 3, during a message sent when a window is ready to be displayed by a process, a resource file associated with the window, or memory image derived from the resource file, is processed as follows. First, in step S10, an information object is defined for each control to compile a list.

In step S20, a bounding rectangle is derived from the control definitions which indicate the size and location of each control relative to the window borders. According to one embodiment, the bounding rectangle is the minimum-sized rectangle that contains all the controls.

In step S30, the location of each control is related to the bounding rectangle in the respective information object.

In step S40, a list of edges is formed, one edge for each control. Each edge is a continuous line that tightly bounds the control on four sides, top, bottom, left, and right. Each edge is associated to a control.

In step S50, the edges are sorted in ascending order of position. That is, the horizontal edges are sorted so that the ones that are spatially close together are adjacent in the list. The vertical edges are sorted so that the ones that are spatially close together are adjacent in the list.

In step S60, a series of horizontal guides is generated. Each guide lies midway between adjacent horizontal edges. This assumes overlapping edges are considered a single edge or are removed from the list. The result of defining these horizontal guides is a series of rows, one between each guide.

Those rows that are overly narrow (spaced apart below some threshold distance), are deleted from the series in step S70.

In step S80, a series of vertical guides is generated. Each guide lies midway between adjacent vertical edges. This assumes overlapping edges are considered a single edge or are removed from the list. The result of defining these vertical guides is a series of columns, one between each guide.

Those columns that are overly narrow (spaced apart below some threshold distance), are deleted from the series in step S90.

In step S100, the edge of each control is bound to its nearest guide so that each control is connected with a respective top, bottom, left, and right guide.

In step S110, the number of rows and columns spanned by each control is determined.

In step S120, the distance of each control to the nearest column/row is determined.

In step S130, the sizeability of each column and row is determined. This is done by weighting each column and row as follows. For each row, add two (2) to its weight for each vertically resizable control within it and subtract one (1) from its weight for each vertically non-resizable control within it. For each column, add two (2) to its weight for each horizontally resizable control within it and subtract one (1) from its weight for each horizontally non-resizable control within it. If the total weight is zero or greater, the column or row is deemed resizable. Non-resizable controls are ignored if the control is the last control in its row or column. For example, suppose a window has three (3) rows and (2) columns. The first row of the window contains a single label in the first column. The last row contains a label in the second column, and the middle row contains an edit control which spans both columns. The first label is 'ignored' as there are no controls to the right of it and it is the last control in its row. Similarly, the label in the last row is ignored since it is the last control in its row. Therefore, the edit control may be resized horizontally. The same logic is applied to columns. If the control is the last control in its column then it is ignored in terms of vertical resizing.

Next, in step S140, the control definitions are searched to determine if any rows or columns qualify as special. The idea behind designating columns and/or rows as special is to keep controls in an ergonomic and visually pleasing arrangement. Control buttons for canceling and accepting changes made in a window are frequently grouped together in a particular location, typically along the right edge or bottom edge of the window. Frequently, these controls are also located adjacent a corner or in the center (vertical alignment) or middle (horizontal alignment) of the edge. Adornments, such as help icons, are typically placed along the top edge of a window. According to one embodiment, the adornment controls are ignored from the resize calculations. For example, the 'help' icon and the 'header' or 'separator' are ignored. The help icon is ignored in the bounding rectangle calculations and is positioned independently of the controls on the page. The separator is a full width control which is sized full width but does not impact the sizing nature of the columns it spans. When a column or row is designated as special, the spacing and alignment (as well as size) of these controls is maintained when the window is resized. In step S140, the data are searched for controls that indicate such a special placement. The criteria for being considered special may include whether the column or row contains a respective column or row of equal-sized buttons aligned with the respective vertical or horizontal edge. When a column and/or row is designated as special, the controls within them, that fit these criteria are treated as one (to preserve spacing) and their alignment (top, bottom, center, left, right, middle) preserved.

In step S150, the alignment information is determined. If, for example, the controls fall within a threshold distance from an edge, they may be considered aligned with that edge (top, bottom, center, left, right, middle). If they are, in the aggregate, aligned, within a tolerance zone, with the middle of an edge, they may be designated as center or middle-aligned. In step S150, the sizes of the bounding rectangle for the special controls is also determined. One criteria may be that special controls share common edges, so that there may be no more than two extra edges for each control over and above the edges that bound the group.

Figure 4:
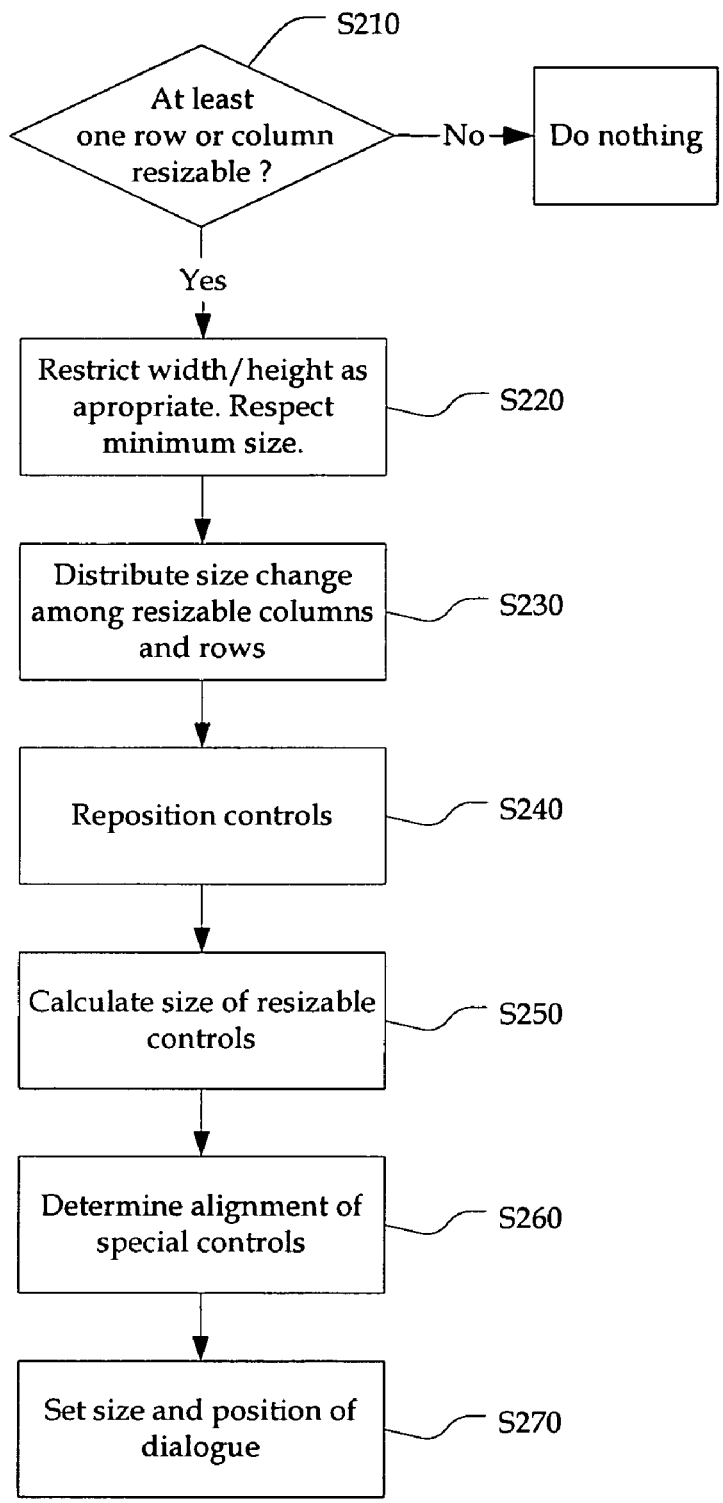
FIG. 4 is a flow chart of a procedure for resizing a window responsively to the determined attributes.

FIG. 4 illustrates a process for resizing a window, in accordance with aspects of the invention. Upon an appropriate event or message, for example in Windows CE®, the message WM_INITDIALOG would be sent, the process illustrated in FIG. 4 may be invoked. In step S210, if at least one column or row is determined to be resizable, control passes to step S220, otherwise the function would do nothing in response to the message. At step S220, resizing information is filtered. Only vertical resizing information is processed when only one or more rows is resizable. Similarly, only horizontal resizing information is processed when only one or more columns is resizable. If the resizing information indicates a vertical or horizontal size smaller than a minimum size, the resizing information is filtered out and not acted upon. For example, rows and columns are not allowed to become negative in height. There are also some controls in which a minimum height is used. For example, in a scroll box the minimum height is limited to the size of the list that contains at least three items. The minimum height may be set to different heights so long as the control is still usable. In step S230, the vertical and/or horizontal space size change may be distributed evenly among the resizable rows and columns, respectively. Alternatively, the space may be distributed according to some predefined weighting scheme. The scheme could be simple or complex. For example, a resizability "score" may account for the predetermined usefulness of resizing each particular type of window element so that a column having multiples of such elements would receive a high score and a correspondingly higher share of the changed width. For example, edit boxes may be given a higher score than list boxes. In step S240, the controls are repositioned according to the guides to which they were deemed attached. According to one embodiment, when there is a rounding error the extra space is added to the first column. For example, if there are 22 pixels to be divided among three controls then the spacing would be 8, 7 and 7.

In step S250, resizable controls are resized by gluing their edges to their bounding guides so that their size is determined by the increase (or decrease) in the distance between the bounding guides. That is, the edges of the controls remain a fixed distance from their bounding guides both before and after resizing. Thus, a resizable control overlaying two resizable columns will expand more in width than a control overlaying only one resizable column.

In step S260, the alignment of special controls is determined. As indicated above, if a control is part of a special group (such as a control that is evenly spaced and aligned along a border), these controls are treated as a single non-resizable object and they follow the adjacent alignment guide. For example, if the controls are deemed right aligned, they follow the right-most guide. For the other controls, if they are within a column or row that is resizable, those controls that are not resizable may be connected with one of their bounding guides or kept centered between their respective bounding guides. Additionally, if a control is initially defined as a non-resizable object but there are not other controls restricting its change in size, then the control may be resized. For example, a control, such as a button, in a row with no other controls in the same row may be adjusted horizontally. Finally, in step S270, the size and position of the window is established.

Figure 5:
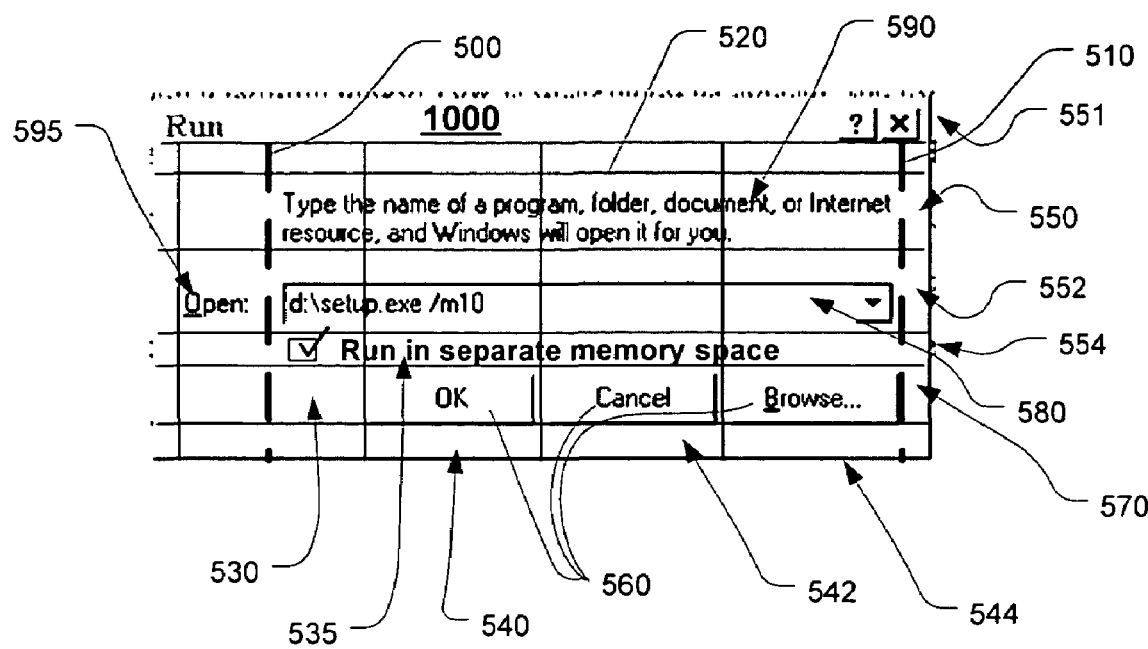
FIG. 5 is a diagram of a simple window showing guides and other attributes defined.

Referring to FIG. 5, a simple window 1000 has a combo control 580, buttons 560, a check box 535, and statics 590 and 595. When the operating system functions are invoked by the appropriate message call (for example in Windows CE® the message would be WM-INITDIALOG), data defining the window is loaded into memory from the resource file defining the window 1000. Following the steps described above, guide lines 520 (typical horizontal guideline) 510, 500 (the latter being bounding guides for a resizable combo control 580) are defined. Columns 540, 542, and 544 are designated as resizable because they contain a non-resizable control, a respective one of buttons 560, and the resizable controls: static 590, check box 535 (check box includes both the actual box and the label that spans across the three columns as a single control), and combo box 580. Thus, the score for these columns would be +2 +2 +2 −1, or 5, making the total weight greater than zero. Controls 560 are not resizable for two different reasons. The first reason is that each of the buttons has another button next to it in the same row. The second reason is that row 570 is considered special.

For column 530, the total weight is six because column 530 contains resizable controls, static 590 and check box 535, and combo control 580. Thus, column 530 is resizable because its total weight is +2 +2 +2, or six. Static 590 and check box 535 are resizable since there are no other controls that are not resizable next to them. In this particular example, static 590 is the only control within row 550 and is therefore considered resizable. Similarly, checkbox 535 is considered resizable since it is the only control in row 554.

Rows 550, 552, 554, and 570 are all non-resizable. First, none of these rows contains a vertically resizable control. All contain a vertically non-resizable control. Therefore the score for each is less than zero. Thus, during execution of the resizing command, the vertical resizing information is filtered out.

Row 570 is found to be a special row since it is the lowest row where the buttons are aligned horizontally. Therefore row 570 would not be designated as resizable for that reason alone. The reason it is special is that this row is the lowest row of buttons that are the same and aligned with the bottom edge of the window. As discussed above, such special status may be accorded by various criteria. Row 551 is also designated special as it includes adornments. Consistent with the style guide incorporated by reference below, where a set of controls are equally spaced and aligned along one edge (in this case, the bottom edge of the window) and apparently "right-justified", "center justified", or "left-justified" (in this case, "right-justified"), the controls are designated as special. The "right-justification of the controls will remain when the window is resized. That is, call three buttons 560 will remain a fixed distance from the right guide 510.

Note that the guides shown in FIG. 5 were defined by placing guides midway between all control edges and eliminating guides that were separated by less than a minimum spacing. Thus, if the buttons 560 were staggered vertically slightly, they would still be grouped together in a single row 570 after closely spaced guides were eliminated. Also note that although all guides fall midway between control edges, the guides that bound the entire set of controls lie directly adjacent the controls that determine their positions.

To determine the new size and location of the only resizable control, the bounding vertical guides 500 and 510 are used. These bounding guides 500 and 510 are separated further apart by a size increase command and the column 530 correspondingly dilated. The edges of the resizable control 580 remain fixed distances from these guides when the window 1000 is resized. Thus, the edges of the combo control 580 remain "glued" to the bounding guides 500 and 510 as the window is resized.

The resizing data may be persisted by storing resizing data in a central data store such as the Registry of Windows Since users often change their output device, for example by docking a notebook computer, the persistence information may end up being applied under undesirable circumstances. Therefore, it is sometimes preferred not to act upon persisted resizing data although many applications do persist this resizing information. Alternatively, it may be preferable in operating systems where the configuration data is available, to make the persisted resizing data contingent on the configuration. For example, if the operating system can determine if the computer is docked and the size of the screen is specified for the docked configuration, the persisted information may be implemented. Otherwise the minimum size may be used.

The border may be defined according to any suitable criterion for purposes of detecting when the pointing device overlies a border.

Figure 6A:
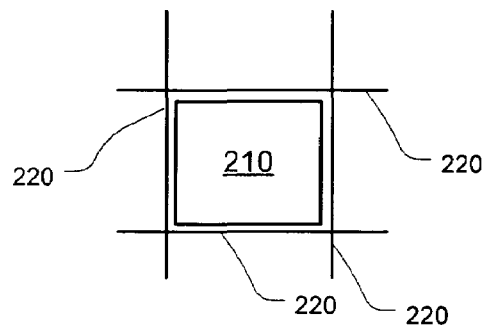
FIGS. 6A-6D illustrate alternative behaviors of non-resizable controls before and after horizontal resizing of a window.
Figure 6B:
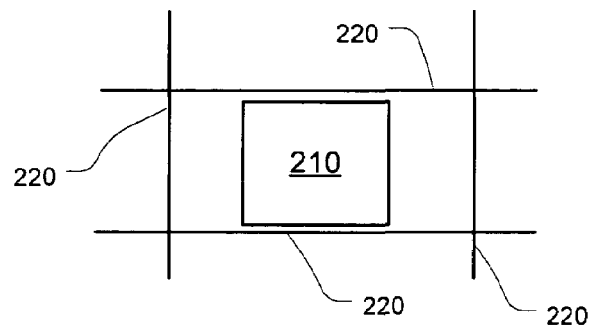
Figure 6C:
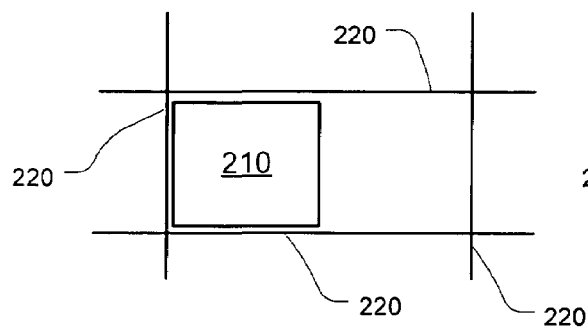
Figure 6D:
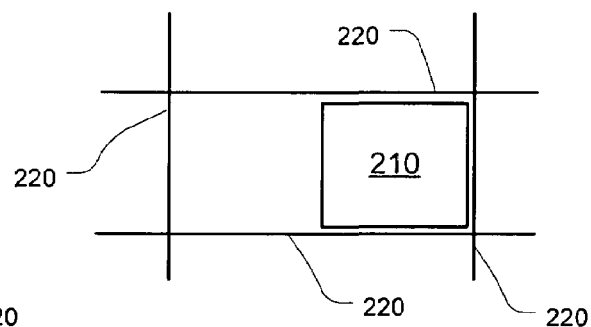

Referring to FIGS. 6A-6D, a non-resizable 210 control whose bounding guides (those closest to each of its respective outer edges) 220 are separated by virtue of being separated by a resizable column, can move in various different ways when the guides 220 are moved. For example, starting with the configuration of FIG. 6A, control 210 can remain equidistant between the guides 220 as shown in FIG. 6B. Alternatively, control 210 can follow one of the guides either to the left or to the right when the window is resized as shown in FIGS. 6C and 6D, respectively. As discussed above, when the control is resizable, it remains glued at its edges to the respective bounding guides. The above applies equally to vertical resizing as well.

Figure 7:
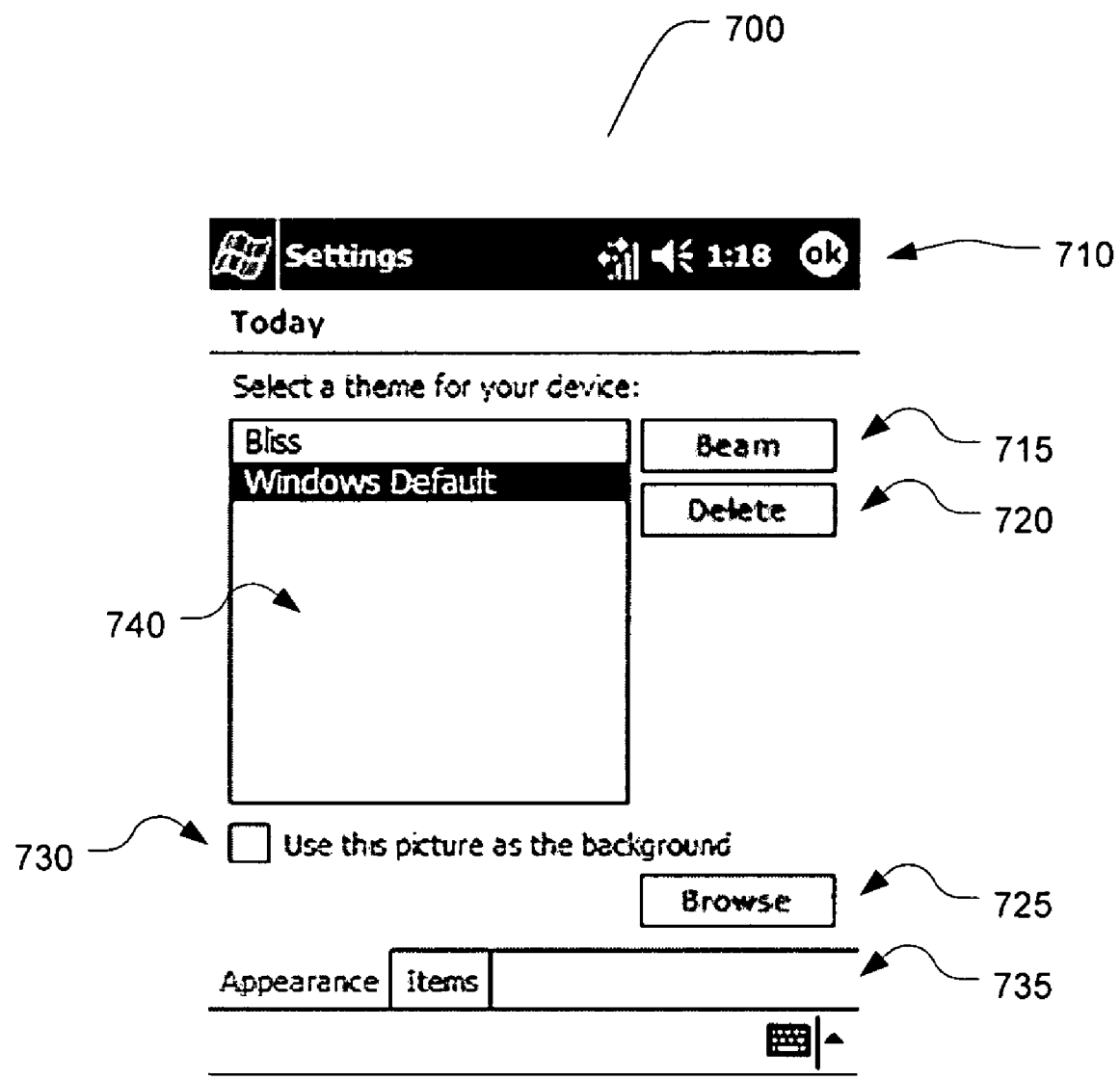
FIG. 7 shows an exemplary portrait view of a window.
Figure 8:
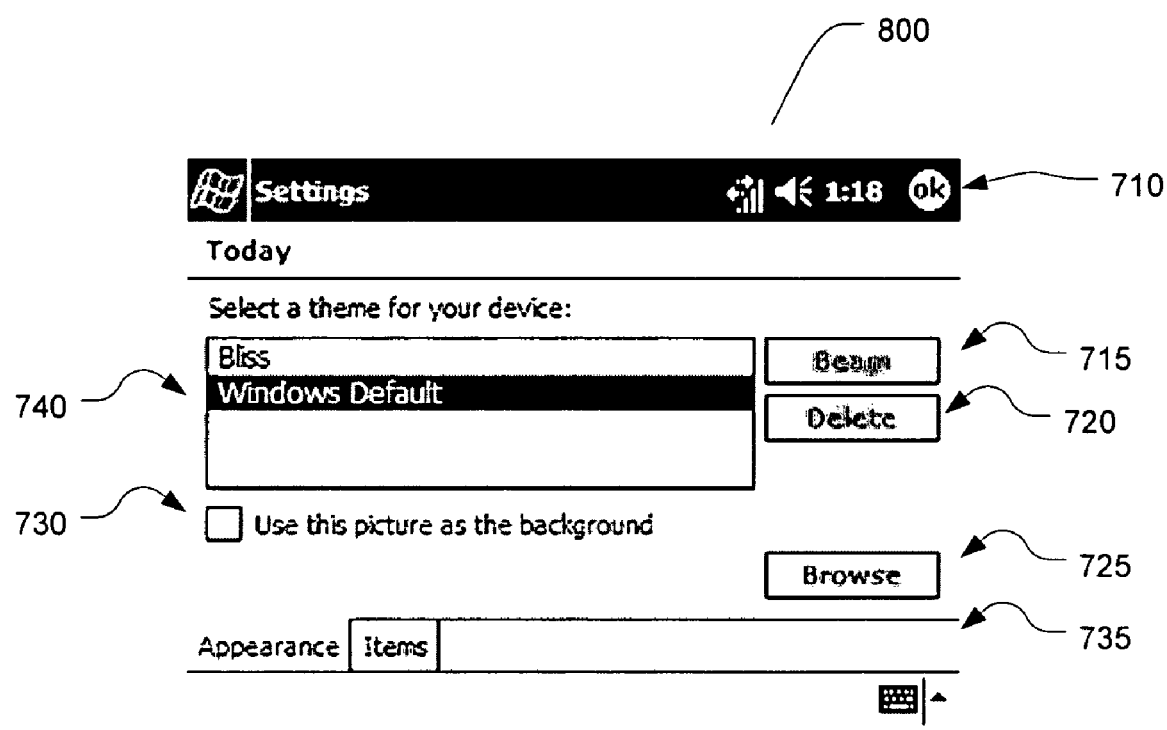
FIG. 8 shows an exemplary landscape view of a window, in accordance with aspects of the present invention.

FIGS. 7 and 8 show an exemplary window that has changed from a portrait view to a landscape view, in accordance with aspects of the invention.

Following the steps described above, window 700 has been resized to window 800 as shown in FIG. 8. As can be seen, buttons 715, 720, 735, along with the adornments have not been resized. Checkbox 730 was also not resized. List box 740 was resized to decrease the number of rows and adjusting the width of the column. Box 735 was increased in width since adjusting its height would not affect any of the other controls.

Although in the embodiments discussed above, the walk-through of the window definitions is done when the window is displayed, according to alternative embodiments, this walk-through could be done at other times using the teachings of the current specification. For example, the resource file or other data used to define the window may be surveyed and an additional file generated for holding resizing data. This resizing data could be generated even before of the software application that defines and uses the windows.

Although in the embodiments described above, the example of windows is discussed, it is apparent from the teachings of the present disclosure that the invention is applicable to other kinds of user-interface elements as well. For example, the invention is applicable to dialog boxes, forms, message windows, or any type of "top level window."

The following reference contains additional rules that may be, and preferably are, used to control the resizing process. The entirety of the following book is incorporated herein by reference. *The Windows Interface Guidelines for Software Design: An Application Design Guide,* 576 pages, Published by Microsoft Press, Publication date: Jul. 1995, ISBN: 1556156790.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method in an operating system for resizing an operating system interface element containing controls that have control definitions, comprising:
   receiving a command to resize the interface element;
   defining resizable regions of the interface element including determining whether each of the controls within the interface element is resizable, wherein defining resizable regions of the interface element includes ignoring an adornment control, the adornment control adjacent to an edge of the interface element, and the adornment control is any one of the following: a help icon, a separator, or a header;
   cumulating a total score by adding a value associated with each control in a given column or row contributing its respective value to the total score for the respective column or row, the column or row being designated as resizable based on the total score for the column or row and a minimum height and width is maintained; wherein cumulating the total score includes either ignoring a control that is a last control in its row or ignoring a control that is a last control in its column;
   adjusting the resizable regions in response to the determinations regarding the special row and the special column; and
   resizing the interface element by resizing only the resizable regions of the interface element.

2. The method of claim 1, wherein the step of defining includes defining guides separating columns and rows of the controls, such that each of the resizable regions is bounded by at least two of the guides.

3. The method of claim 2, wherein the guides are defined such that a separation between adjacent ones of the guides is always a minimum magnitude.

4. The method of claim 2, wherein defining includes identifying each of the controls as to whether it is vertically or horizontally resizable and designating each of the columns and rows as resizable responsively to the step of identifying.

5. The method of claim 1, wherein defining includes identifying each of the controls as to whether it is vertically or horizontally resizable.

6. The method of claim 5, wherein defining includes defining guides separating columns and rows of the controls, such that each of the resizable regions is bounded by at least two of the guides.

7. The method of claim 6, wherein the interface element is a window.

8. The method of claim 2, further comprising the steps of:
   designating a row as special when the row contains a set of controls that lies in a predetermined geometric configuration with a predefined range of tolerance;
   designating a column as special when the column contains a set of controls that lies in a predetermined geometric configuration with a predefined range of tolerance; and
   resizing the interface element while maintaining a fixed geometric distance between the controls of the set after the step of resizing.

9. The method of claim 2, wherein defining the resizable regions of the interface element including determining whether each of the controls within the interface element is resizable further comprises determining when a control may be resized that is initially considered non-resizable.

10. The method of claim 9, wherein determining when the control may be resized that is initially considered non-resizable further comprises determining when there are no controls that would be impacted by resizing the control.

11. A computer readable storage medium for dynamically resizing a window without altering operating system code, the window containing controls, the controls being defined by properties indicating respective positions of each of the controls within the window and control-type data indicating respective types of each of the controls stored in a memory, comprising:
   receiving a command to resize the window,
   identifying for each control whether the control is resizable based on the control type and position of the control relative to any of the other controls within the window;
   responsively to the step of receiving, dividing the window into subareas,
   responsively to the step of dividing, dynamically determining whether the subareas are resizable based on the resizability of the controls that are at least partially in the subareas while maintaining any minimum height associated with the controls; wherein the determining whether the subareas are resizable includes;
   ignoring an adornment control; and
   either ignoring a control that is a last control in its row or ignoring a control that is a last control in its column; wherein a control is the last control in its column when there are no controls below the control in its column; and wherein a control is the last control in its row when there are no controls to the right of the control in its row; and
   resizing the window by resizing the resizable subareas of the window; wherein the resizing is executed independent of ignored controls.

12. The computer-readable medium of claim 11, wherein dividing the window into subareas, further comprises defining guides separating columns and rows of the controls, such that each of the resizable regions is bounded by at least two of the guides.

13. The computer-readable medium of claim 12, wherein the guides are defined such that a separation between adjacent ones of the guides is always a minimum magnitude.

14. The computer-readable medium of claim 12, wherein dividing the window into subareas, further comprises identifying each of the controls as to whether it is vertically or horizontally resizable and designating each of the columns and rows as resizable.

15. The computer-readable medium of claim 11, wherein identifying for each control whether the control is resizable further comprises identifying each of the controls as to whether it is vertically or horizontally resizable.

16. The computer-readable medium of claim 15, wherein dividing the window into subareas further comprises defining guides separating columns and rows of the controls, such that each of the resizable regions is bounded by at least two of the guides.

17. The computer-readable medium of claim 11, further comprising the steps of:
   designating a row as special when the row contains a set of controls that lies in a predetermined geometric configuration with a predefined range of tolerance;
   designating a column as special when the column contains a set of controls that lies in a predetermined geometric configuration with a predefined range of tolerance; and
   resizing the window while maintaining a fixed geometric distance between the controls.

18. The computer-readable medium of claim 11, wherein identifying for each control whether the control is resizable based on the control type and the position of the control relative to any of the other controls within the window further comprises determining when there are no controls that would be impacted by resizing the control.

* * * * *